(12) United States Patent
Kraus et al.

(10) Patent No.: US 10,994,492 B2
(45) Date of Patent: May 4, 2021

(54) APPARATUS AND METHOD OF WELDING FABRIC MATERIAL TO A FRAME INCLUDING FOR REMOVABLE USE IN A DOOR OR WINDOW OPENING

(71) Applicant: Kenneth A. Fullick, McHenry, IL (US)

(72) Inventors: Thomas S. Kraus, McHenry, IL (US); Kenneth A. Fullick, McHenry, IL (US)

(73) Assignee: Kenneth A. Fullick, McHenry, IL (US)

( * ) Notice: Subject to any disclaimer, the term of this patent is extended or adjusted under 35 U.S.C. 154(b) by 102 days.

(21) Appl. No.: 15/838,925

(22) Filed: Dec. 12, 2017

(65) Prior Publication Data

US 2019/0178031 A1  Jun. 13, 2019

(51) Int. Cl.
*B29C 65/02* (2006.01)
*E06B 9/52* (2006.01)
*B29L 31/00* (2006.01)

(52) U.S. Cl.
CPC ............... *B29C 65/02* (2013.01); *E06B 9/52* (2013.01); *B29L 2031/724* (2013.01); *E06B 2009/527* (2013.01)

(58) Field of Classification Search
CPC ... B29C 65/10; B29C 66/8362; B29C 70/386; B29C 70/388; B29C 70/382; B29C 70/384; B29C 65/02; B29C 66/729; E06B 9/52; E06B 2009/527; B29L 2031/724; B29L 2031/737; A47G 5/00; B23P 19/047
USPC .................................................. 156/497, 499
See application file for complete search history.

(56) References Cited

U.S. PATENT DOCUMENTS

| | | | | |
|---|---|---|---|---|
| 5,141,585 A | * | 8/1992 | Shinno | B29C 70/388 156/350 |
| 5,804,029 A | * | 9/1998 | Achelpohl | B29C 65/103 156/497 |
| 6,279,644 B1 | * | 8/2001 | Wylie | E06B 9/52 160/371 |
| 9,234,388 B2 | | 1/2016 | Altieri, Jr. | |
| 2003/0029546 A1 | * | 2/2003 | Wylie | E06B 9/52 156/160 |
| 2007/0000606 A1 | * | 1/2007 | Steelman | B29C 63/0073 156/322 |
| 2012/0261069 A1 | * | 10/2012 | Blot | B29C 70/386 156/324 |
| 2014/0130985 A1 | * | 5/2014 | Weimer | B32B 37/06 156/583.1 |

* cited by examiner

*Primary Examiner* — John L Goff, II
(74) *Attorney, Agent, or Firm* — Loppnow & Chapa

(57) ABSTRACT

The present application provides an apparatus and a method of welding a fabric material to a frame including for removable use in a door opening or a window opening. The method includes receiving the frame having an outer edge defining an interior space at a work surface. The fabric material is then extended across the frame, so that the fabric material to be welded to the frame rests on top and covers the interior space of the frame received at the work surface. An activated welding head is then moved across the work surface and the received frame, wherein the activated welding head is moved so as to trace proximate the frame along the outer edge of the frame, thereby adhering the fabric material to the frame at the outer edge.

18 Claims, 8 Drawing Sheets

APPARATUS AND METHOD OF WELDING FABRIC MATERIAL TO A FRAME INCLUDING FOR REMOVABLE USE IN A DOOR OR WINDOW OPENING

FIELD OF THE APPLICATION

The present disclosure relates generally to an apparatus and method for the adhesion of a fabric material to a frame, which can be used as a screen, such as for the removable use in a window and/or a door opening, and more particularly, to a method and an apparatus for the welding of a fabric material including screen material to a frame, which can be compressed during the adhesion of the fabric material, where when released the overall shape of the screen is held under tension by a shape memory in the frame.

BACKGROUND

Windows and screens have been used to vary the degree to which the inside of a structure will be exposed to the outside world. Where windows whether open or closed will allow light to enter a structure, only an open window is intended to let air from the outside into the structure. However sometimes other items in addition to air will try to come in through an open window. For example, bugs, birds and/or airborne debris will sometimes also try to enter a structure through an open window. Some screens can be used to filter the transmission of some of the larger items from entering or exiting a structure with the free flow of air. Additionally and/or alternatively, some screens can be used to block and/or filter at least some aspects of the light that is passing through either an open or closed window.

Screens are often made from a mesh material, which is formed within a frame which is sized to correspond to and have a perimeter, which extends around the outer circumference of the opening. A frame will often provide the screen material with additional structure, so that it can be handled by a user when removing or installing a screen, as well as to help hold it in place once installed. At least some screens will generally try to minimize any visual obstruction, while also trying to filter out larger elements or particles, that the user does not want to be able to traverse through an open window. In other instances, it may be possible that the screen material, itself (i.e. whether formed from a mesh or a more uniformly solid material), will purposefully also provide some light filtering or obstruction, which could be effective whether the window was open or closed.

When the overall screen size corresponds closely to the size of the opening, installation of a screen can sometimes be a challenge. Generally, the screen needs to be able to clear any existing structure when being inserted, while also needing to be able to be sized so as to be readily retained within the structure while resisting the forces of any unwanted flow of creatures and/or material through the opening when the screen is installed.

At least one type of screen described in Altieri, Jr., U.S. Pat. No. 9,234,388, which is incorporated herein by reference, describes a type of screen that includes a frame made from a material that exhibits a memory as to size and shape, which can be temporarily deformed by compressing the overall shape of the screen by a user when attempting to install and/or remove the screen from an opening, but then the screen fairly readily returns to its original shape, when no longer being handled by the user. In Altieri, Jr., '388, the frame of the screen, when the mesh is secured to the frame, is kept under tension, which biases the frame toward its intended shape, which will generally correspond to the stretched size of the attached mesh material, and often will also be sized and shaped to generally correspond to the size of the opening. However, because the frame is to be maintained by the attached screen material under tension, so as to more readily hold its intended shape, the attachment of the screen or fabric material to the frame during fabrication and/or construction can sometimes be a challenge.

The present inventors have recognized that, by providing a work surface to receive the frame prior to overlaying the fabric material and welding the fabric material to the frame by moving a welding head across the work surface and the received frame, a suitable screen can be produced that provides for ready installation into an opening, and which will return to an undeformed state, which will allow the screen to readily stay in place, once installed. Similarly, a user can also readily remove the screen when desired, by applying a further deformation force, which allows the size of the screen to be temporarily changed so as to clear any obstructions that might limit the insertion and/or removal of the screen.

SUMMARY

The present application provides a method of welding a fabric material to a frame for removable use in a door opening or a window opening. The method includes receiving the frame having an outer edge defining an interior space at a work surface. The fabric material is then extended across the frame, so that the fabric material to be welded to the frame rests on top and covers the interior space of the frame received at the work surface. An activated welding head is then moved across the work surface and the received frame, wherein the activated welding head is moved so as to trace proximate the frame along the outer edge of the frame, thereby adhering the fabric material to the frame at the outer edge.

In at least one embodiment, as part of moving an activated welding head across the work surface and the received frame includes applying a source of heat as the welding head traces along the outer edge of the frame followed by in a direction of movement of the activated welding head, applying a source of pressure, which presses a heated portion of the fabric material against a corresponding portion of the heated frame.

In a further embodiment, the welding head rotates so as to maintain the source of heat and the source of pressure in line with the direction of movement of the welding head as the welding head traces along the outer edge of the frame.

The present application further provides an apparatus for welding a fabric material to a frame for removable use in a door opening or a window opening. The apparatus includes a work surface for receiving a frame having an outer edge defining an interior space, and for receiving fabric material, which extends across the work surface and the frame including the interior space of the frame. The apparatus further includes one or more welding heads, wherein at least one of the one or more welding heads, when activated, moves along the outer edge of the frame for adhering the fabric material to the frame at the outer edge.

In at least one embodiment, the at least one of the one or more welding heads includes a heater element, which when activated, supplies heat to elements located proximate an end of the welding head.

In a further embodiment, the at least one of the one or more welding heads includes a first wheel in line with the heater element in a direction of movement of the respective welding head, wherein the first wheel supplies a force which presses a portion of the fabric material against a corresponding portion of the frame, as the at least one of the one or more welding heads moves past them.

The present application further provides a method of welding a fabric material to a frame having a shape memory. The method includes receiving the frame having an outer edge defining an interior space at a work surface, wherein as part of receiving the frame, the frame is compressed against an internal bias to a desired shape. The fabric material is extended across the compressed frame, so that the fabric material to be welded to the compressed frame rests on top and covers the interior space of the compressed frame received at the work surface. An activated welding head is then moved across the work surface and the compressed frame, wherein the activated welding head is moved so as to trace proximate the compressed frame along the outer edge of the frame. The fabric material is thereby adhered to the compressed frame at the outer edge, so that when the frame is released from the work surface, the shape of frame will be held by the welded fabric material under tension which is biased toward an uncompressed shape remembered by the frame.

These and other features, and advantages of the present disclosure are evident from the following description of one or more preferred embodiments, with reference to the accompanying drawings.

DETAILED DESCRIPTION OF THE PREFERRED EMBODIMENT(S)

Figure 1A:
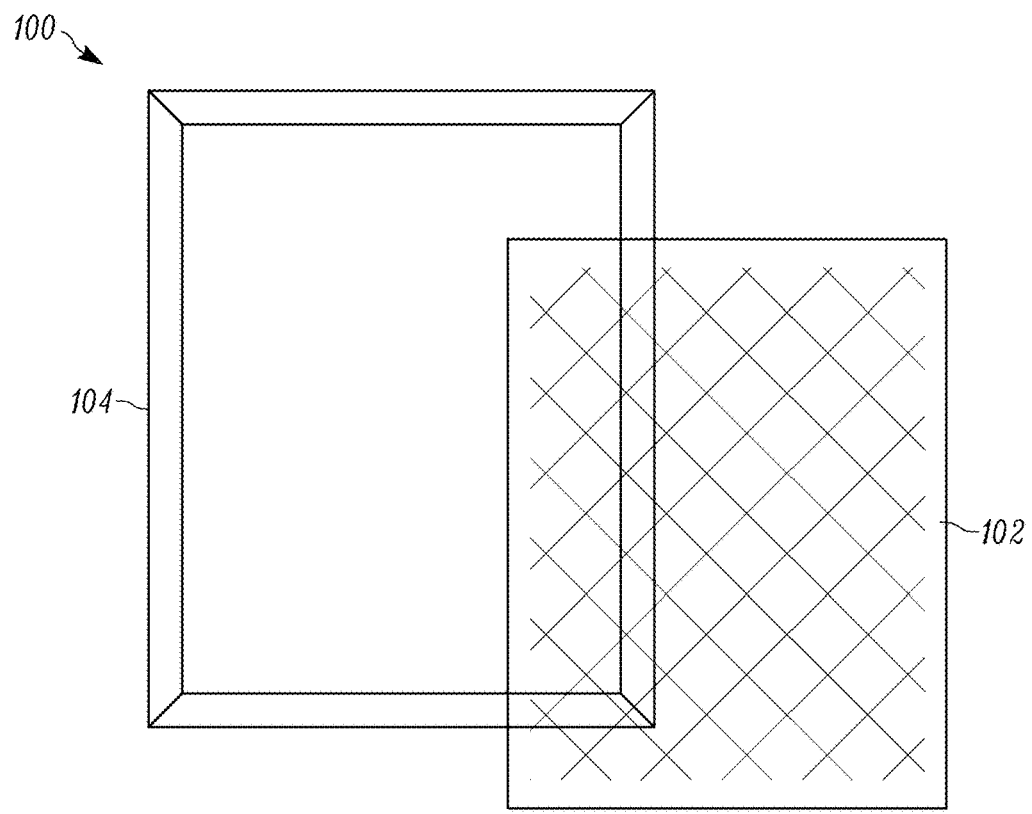
FIGS. 1A through 1C are sequential views of a screen and a window during an exemplary installation of the screen into the window.

While the present invention is susceptible of embodiment in various forms, there is shown in the drawings and will hereinafter be described presently preferred embodiments with the understanding that the present disclosure is to be considered an exemplification and is not intended to limit the invention to the specific embodiments illustrated. One skilled in the art will hopefully appreciate that the elements in the drawings are illustrated for simplicity and clarity and have not necessarily been drawn to scale. For example, the dimensions of some of the elements in the drawings may be exaggerated relative to other elements with the intent to help improve understanding of the aspects of the embodiments being illustrated and described.

Figure 1B:
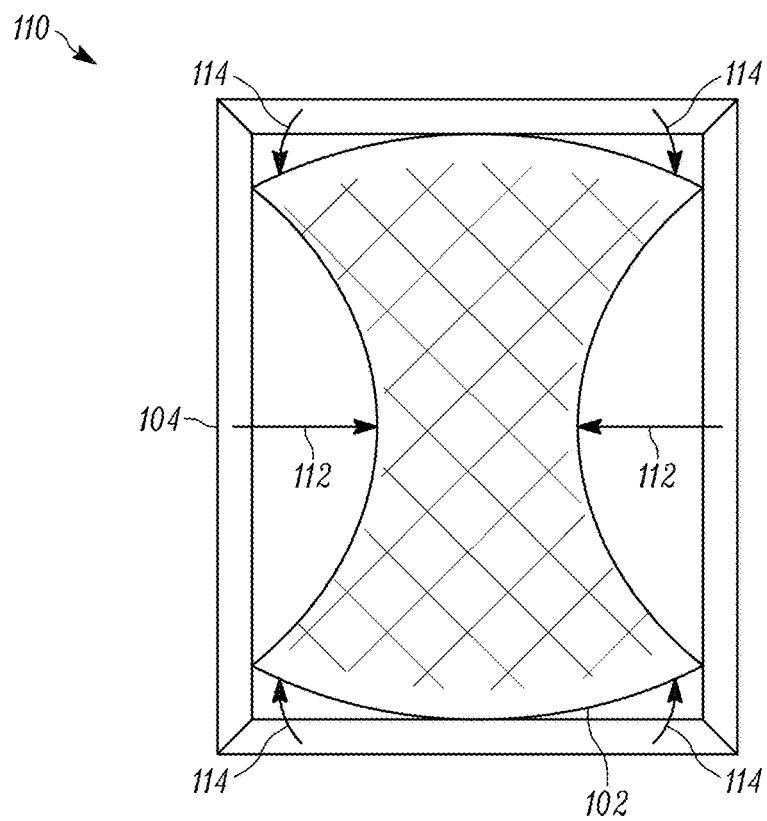
Figure 1C:
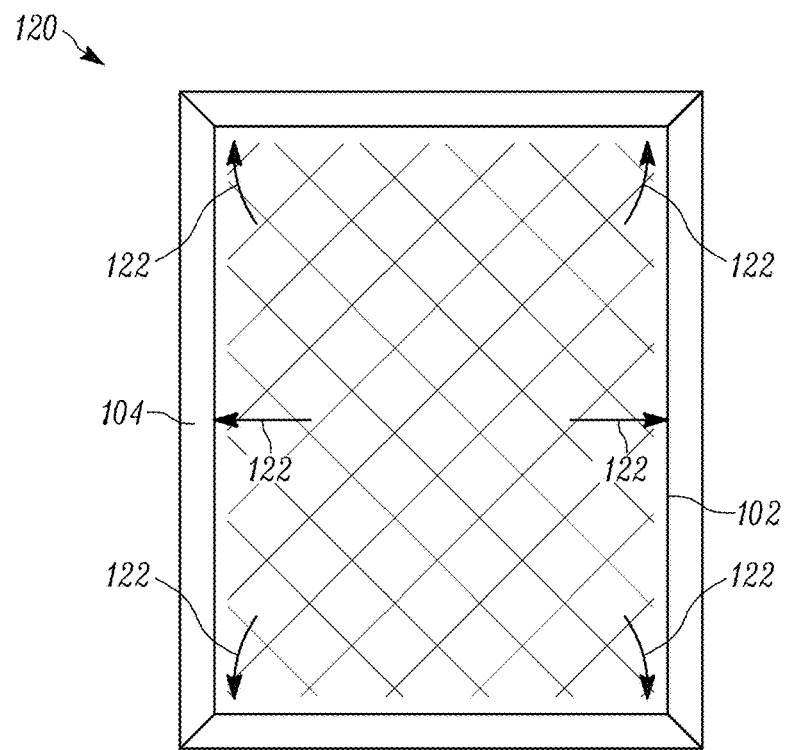

Referring now to the drawings in greater detail, there is illustrated in FIGS. 1A through 1C sequential views of a screen and a window during an exemplary installation of the screen into the window. More specifically, FIG. 1A illustrates a first view 100 in the sequence including a screen 102, which is initially separate from the window 104. As part of insertion of the screen 102 into the window assembly, FIG. 1B illustrates a view 110 of the screen being deformed by a user through a force 112 that is applied to the frame of the screen 102. In the illustrated example, this causes the frame of the screen 102 to flex inward at the sides, which in turn can cause the corners of the screen to also flex 114 inward. This causes the overall shape of the screen to shrink, which makes it easier for the screen to be inserted into the window assembly, so as to cover the opening of the window. When the screen has been received within the window 104, the user can remove the force 112 which has caused the screen 102 to deform. When the force 112 is removed, the frame of the screen 102, which is formed from a material which generally has a memory as to size and shape, will generally attempt to return to its predeformed size and shape. A view 120 of a return to a predeformed size and shape of the screen 102 is illustrated in FIG. 1C, and includes the sides as well as the corners of the frame and correspondingly the screen 102 returning 122 to its unflexed state. In at least some instances, this results in the overall shape of the screen returning to an expanded state, where as part of the expansion, the screen can extend into slots that may be formed in at least some of the sidewalls of the window 104. Expansion into sidewall slots can help to retain the screen 102 within the window 104. Expansion of the frame of the screen can be somewhat limited by the shape of the fabric or screen material that is affixed to the frame.

Figure 2A:
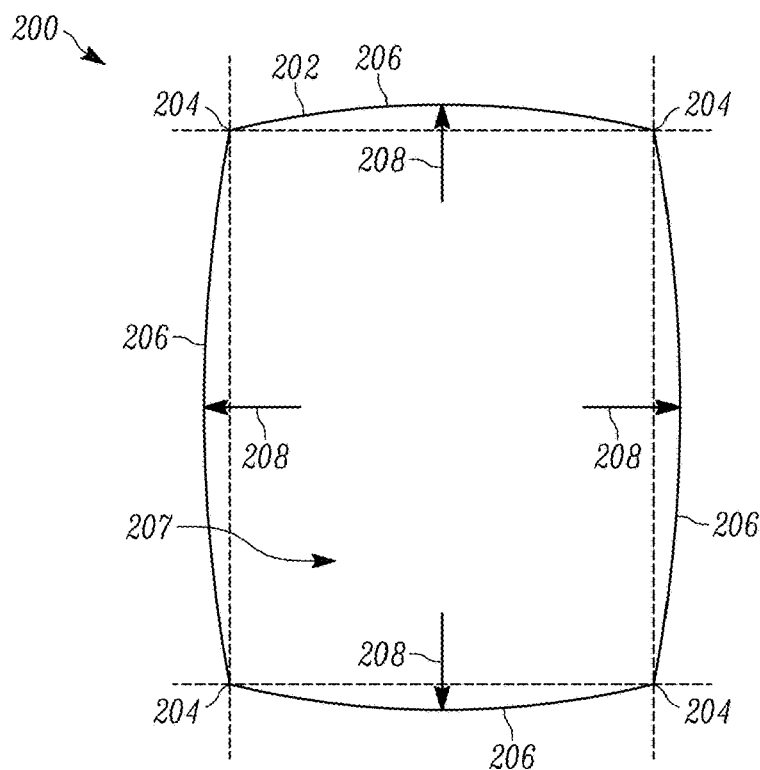
FIGS. 2A through 2C are individual component and composite views of elements which are included as part of and/or form an exemplary screen.
Figure 2B:
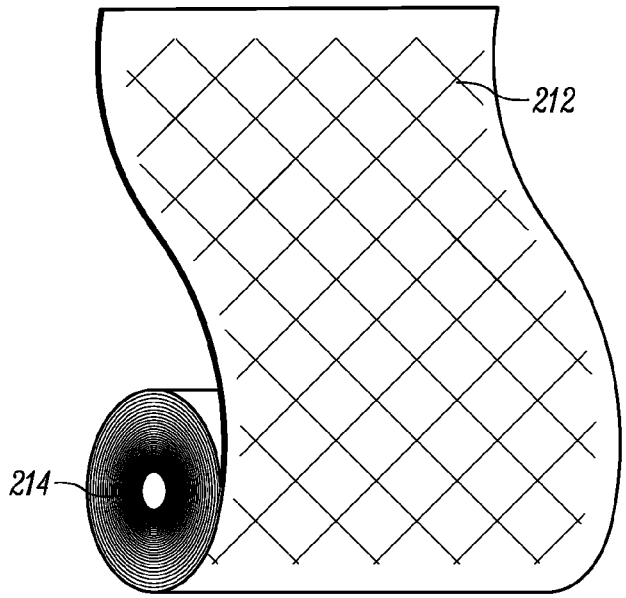
Figure 2C:
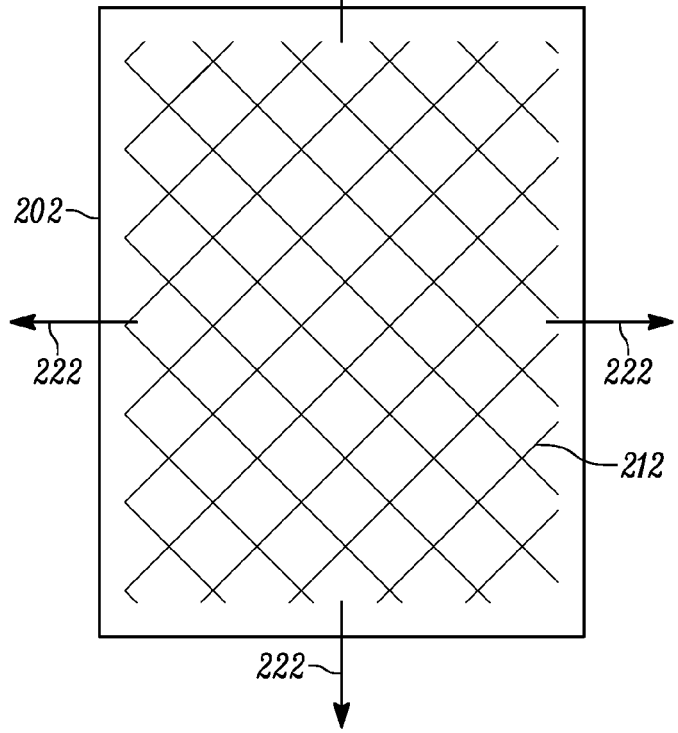

FIGS. 2A through 2C illustrate individual component and composite views of elements which are included as part of and/or form an exemplary screen. More specifically, FIG. 2A illustrates a component view 200 of a frame 202 of a screen prior to the fabric material being affixed thereto. The frame is generally formed from a material, within which a memory as to an undeformed size and shape can be included. In at least some instances, the frame can be formed from steel wire, which has been formed to include one or more corners 204, and having sides 206, where a camber has also been included. In the illustrated embodiment, the frame is generally rectangular in shape, with the ends of the wire being welded together to form a closed loop, where the shape has an outer circumference, which encloses an interior space 207.

In the illustrated embodiment, the installed camber creates a tension in the material, that makes the sides 206 of the frame want to flex 208 outward at least slightly along the length of the sides 206 as the sides extend away from the corners 204. Once formed, the frame can be coated in a material, such as a thermoplastic. At least one example of a suitable theroplastic includes polyvinyl chloride (PVC), that can serve to help resist rusting of the steel wire, as well as supply a layer of material that might weld more readily to a fabric material.

FIG. 2B illustrates a component view 210 of fabric material 212 that can be welded to the frame 202 so as to extend across the interior space 207 of the frame 202 defined by the closed loop of wire material corresponding to an outer edge to which the fabric material 212 might be welded to the frame 202. In at least some instances, the fabric material 212 will come in rolls 214 from which a portion of the fabric material 212 can be extended. The fabric material 212 is used to cover the frame prior to welding the fabric material 212 to the frame 202. In at least some instances, prior to welding the fabric material 212 to the frame 202, the shape of the frame 202 is restricted from bowing outward, so as to more closely correspond to a rectangular shape. However, while the sides of the frame 202 are restricted from bowing outward, during welding of the fabric material 212, the frame material remembers the camber. After welding the fabric material 212 to the frame 202, the fabric material 212 serves to limit the sides 206 of the frame from returning to its slightly flexed form, which in turn creates a tension 222 across the fabric material 212 within the frame 202. FIG. 2C illustrates a composite view 220 of an exemplary rectangular frame 202 with fabric material 212 attached.

While in at least some embodiments, the fabric material might include a mesh material that can allow air to pass, but which might otherwise filter out larger sized elements, such as bugs or leaves, traveling with or through the air, it is also possible that a mesh material that filters all or some of the components of light coming through either an open or closed window could also be used. In such an instance, the fabric material could be used to filter a particular desired amount of light across an electromagnetic spectrum including particular amounts of different wavelengths of visible light, as well as particular amounts of non-visible portions of the spectrum including wavelengths in one or more of the ultraviolet portion of the spectrum and/or the infrared portion of the spectrum.

Figure 3:
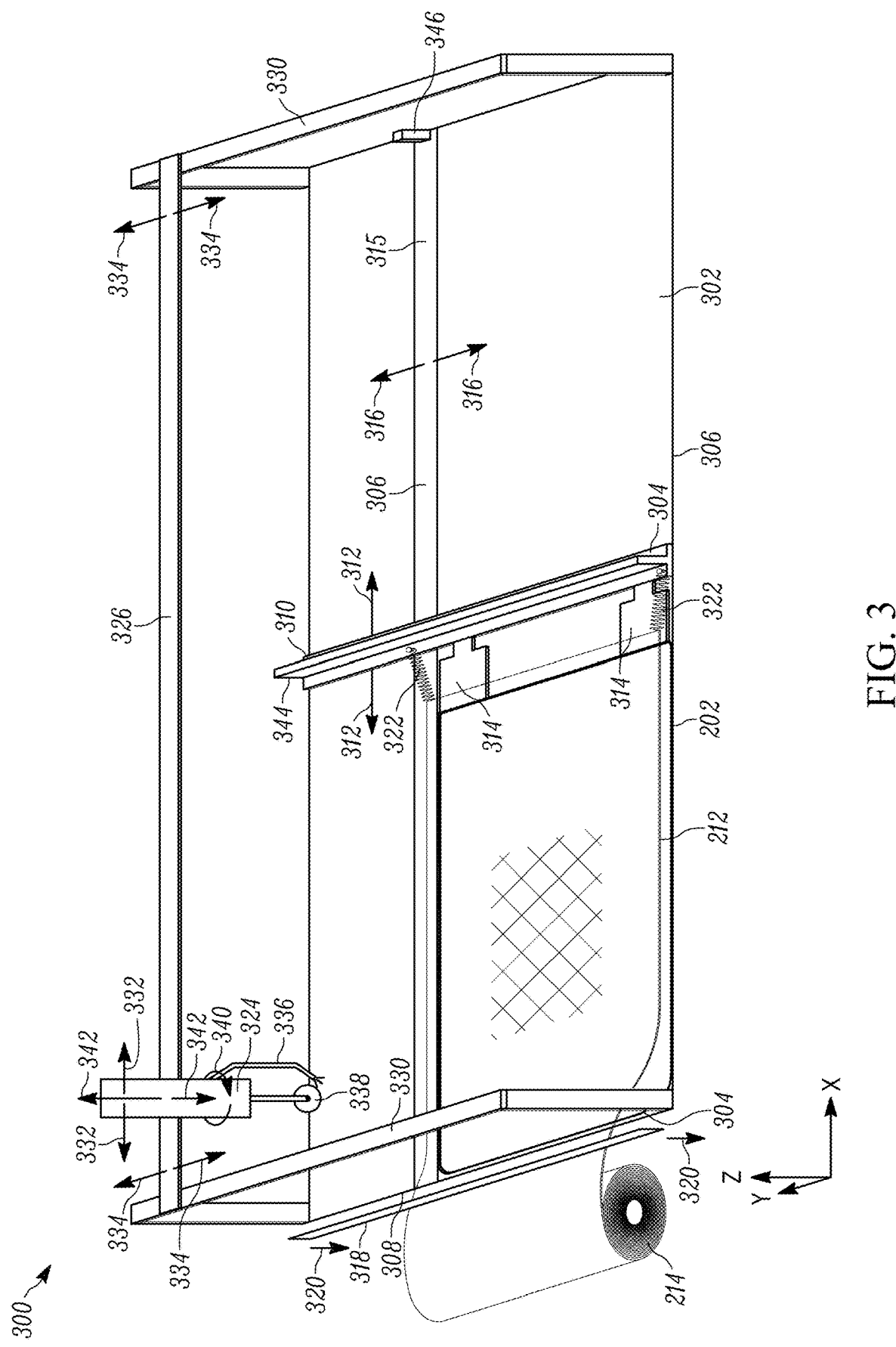
FIG. 3 is a perspective view of an apparatus for welding a fabric material to a frame for removable use in a door opening or a window opening.

FIG. 3 illustrates a perspective view of an apparatus 300 for welding a fabric material 212 to a frame 202, which in at least some instances can be used for removable use in a door opening or a window opening. The apparatus 300 includes a work surface 302 upon which a frame 202 can be received. In the illustrated embodiment, when received by the work surface 302, the frame 202 is captivated between a set of rails 304 and 306, which holds the frame in place, as well as limits the bowing in the sides 206 of the frame 202, which might be present due to the shape being remembered by the frame material, which could include a camber.

By receiving the frame 202 at the work surface, a first set of rails 304 can serve to help hold the desired rectangular shape with respect to at least a pair of sides 206 prior to the fabric material 212 being welded to the frame 202 in a first 'x' direction. While a first one 308 of the first set of rails 304 can be fixed at the edge of the work surface 302, the position of the second one 310 of the first set of rails 304 can be adjusted 312 to accommodate different size frames 202. In at least some instances, spacers 314 can be used in conjunction with one or more of the rails 304 to better manage the receipt and handling of the frame 202. A second set of rails 306 can serve to help hold the desired rectangular shape with respect to at least a pair of sides 206 prior to the fabric material 212 being welded to the frame 202 in a second 'y' direction. Similar to the first set of rails 304, the position of at least one 315 of the second set of rails 306 can be adjusted 316 to accommodate different size frames 202.

Once the frame 202 is received at the work surface 302, the fabric material 212 can be extended across the frame 202, so that the fabric material 212 to be welded to the frame 202 rests on top and covers the interior space of the frame 202 received at the work surface 302. Once extended across the frame 202, one end of the extended fabric material 212 that is more proximate to the roll 214 of fabric material 212 can be captivated by a bar 318 that can be lowered 320, so as to hold the end of the fabric material 212 against the work surface 302. The other end of the fabric material 212, once extended, can be held under slight tension using elastic or a spring 322 clipped to the end of the extended fabric material 212 that is less proximate to the roll 214. The other end of the elastic or spring 322 could be coupled to the adjustable second one 310 of the first set of rails 304.

An activated welding head 324 can then be moved across the work surface 302 and the received frame 202, wherein the activated welding head 324 is moved so as to trace proximate the frame 202 along the outer edge of the frame, thereby adhering the fabric material 212 to the frame 202 at the outer edge. The welding head 324 is coupled to a track 326 which is part of scaffolding that extends in the 'x' direction a distance above (i.e. in the 'z' direction) the work surface 302. Movement along the track could be facilitated using a belt drive, a chain drive and/or one or more motors, which allows the welding head 324 to move 332 along the track 326 in the 'x' direction. The track 326, itself, can move 334 in the 'y' direction along a second set of tracks 328 that is similarly elevated relative to the work surface 302 via further framing/scaffolding 330 located in the illustrated embodiment at opposite ends of the work surface 302.

The welding head 324 includes a source of heat 336 and a source of pressure 338, which can be used to trace the outer edge of the frame 202 for adhering the fabric material 212 to the frame 202 at the outer edge. Generally, the source of heat will precede the source of pressure, as the welding head traces the outer edge of the frame 202. This allows the heat source to raise the temperature of both the coating material on the frame 202, such as PVC, as well as the fabric material and/or a coating on the fabric material, which could include a mesh material similarly formed from and/or coated in PVC. In at least some instances, the fabric material can include a mesh formed from fiberglass, which is then coated in a thermoplastic, such as PVC. The source of pressure can then press the two together after heating so as to form a weld and/or adhesion there between.

In at least some instances, the heating can either melt or make tacky a coating present on both the frame and the fabric material. In instances where the outer layers of the coating materials might melt, a subsequently applied pressure might allow the melted material associated with both the frame and the fabric material to comingle, such that when they return to a more cooled state, the fabric material might be adhered to the frame.

In order for the source of heat 336 to precede the source of pressure 338, as the welding head 324 traces the outer edge of the frame 202, the welding head 324 can be rotated 340 depending upon the current direction of travel of the welding head relative to the work surface 302 and the received frame 202. Additionally, a lifter assembly can be used to selectively lift 342 the welding head 324 relative to the work surface 302 and the received frame 202. The respective movements for both lifting 342 and rotating 340 the welding head 324 can be performed under the control of a microprocessor. In at least some embodiments, the lifting and/or rotation can include the use of a motor, a linear actuator, a hydraulic element, and/or other suitable motion inducing element. In at least some instances, it may be desirable to lift the welding head 324, so as to at least temporarily disengage the welding head 324 from the fabric material 212 and the frame 202, prior to rotating the welding head 324, so as to avoid grabbing, bunching and/or disturbing the layout of the fabric material 212 relative to the frame 202 during rotation 340 of the welding head 324. The lifting of the welding head, prior to rotation, may be more desirable in instances where the anticipated amount of rotation is more material including when the welding head has reached the end of a side proximate at least some corners. With some turns, including turns which may be more gradual, it may be possible for the welding head 324 to be rotated while tracing the outline of the frame, without lifting the welding head 324.

In at least some embodiments, the adjustable rail can include protruding structure that travels with the adjustable rail, that can be used to identify the location of the associated side of the frame 202, that has been received at the work surface 302 and retained by the adjustable rail. For example, a wall 344 that runs the length of the adjustable second one 310 of the first set 304 of rails can be detected by an optical detector present on the welding head 324, which will identify when the location of the corresponding side has been reached. Similarly a post 346 coupled to the adjustable second one 315 of the second set 306 of rails can be detected by an optical detector present on the track 326, which will identify when the location of the corresponding side has been reached. In this way the size of the frame can be detected by the apparatus driving the welding head, where upon fixing a particular frame relative to the work surface via the adjustable rails will at the same time provide one or more landmarks via which the size of the current frame being welded can be detected for purposes of controlling the movement of the welding head.

Figure 4:
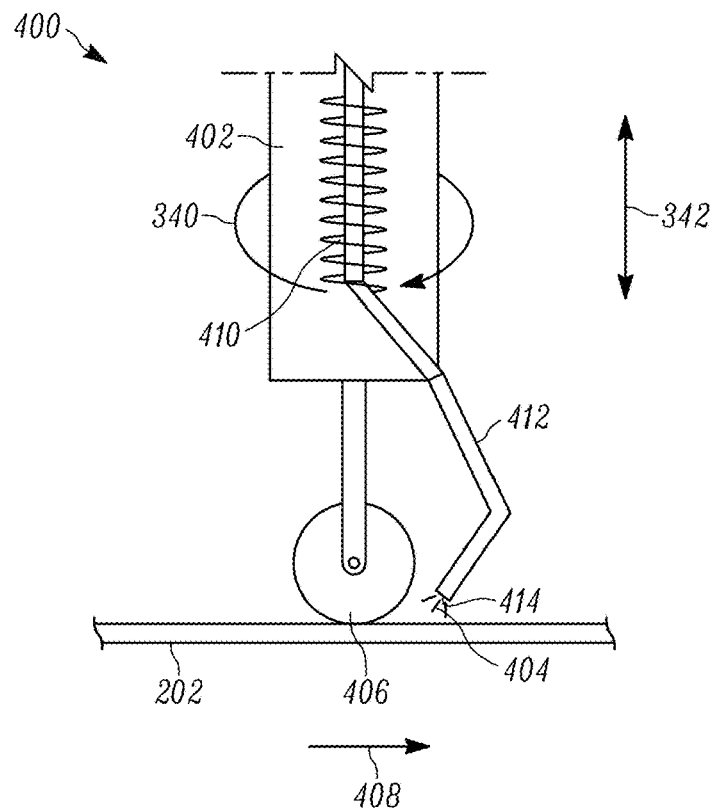
FIG. 4 is a partial side view of an exemplary welding head.

FIG. 4 illustrates a partial side view 400 of an exemplary welding head 402. In the illustrated embodiment, the welding head 402 includes a source of heat 404 and a source of pressure 406, where the source of heat generally precedes the source of pressure in the direction of travel 408. In at least some instances, the source of heat can include a resistive element 410, which heats up when an electric current is supplied to the resistive element. An air flow can be produced which flows across the resistive element 410 that has been heated, thereby causing the air which is part of the air flow to also be heated. Once heated, the air flow can be directed proximate the end of the welding head via an air flow conduit 412, such as a heat resistant plastic tube, having an opening 414 proximate the end of the welding head 402. The amount of heat applied by the heat source to the fabric material 212 and the frame 202, can be controlled by varying the speed of movement 408 of the welding head 402 relative to the work surface 302, and correspondingly the current position of the welding head 402 as the welding head 402 traverses across the fabric material 212 and along the length of the frame 202. Still further, the amount of heat being produced could also be controlled by varying the speed of the air flow across the resistive element 410 and correspondingly through the air flow conduit 412. One could also control the amount of heat by varying the amount of electrical current being supplied to the resistive element 410.

In at least some instances, the source of pressure can be a wheel 416 which comes into contact with and presses against the fabric material 212 and the frame 202. In at least some of these instances, the wheel can be formed from a pliable material, such as rubber, which will deform slightly so as to conform at least slightly to the contact surface and correspondingly spread out the force associated with the pressure being applied to the fabric material 212 and the frame 202. After being sufficiently heated, the applied force can be used to adhere the fabric material 212 to the frame 202 proximate the point of contact. In this way, a fabric material 212, such as a screen, can be welded to a frame 202.

Figure 5:
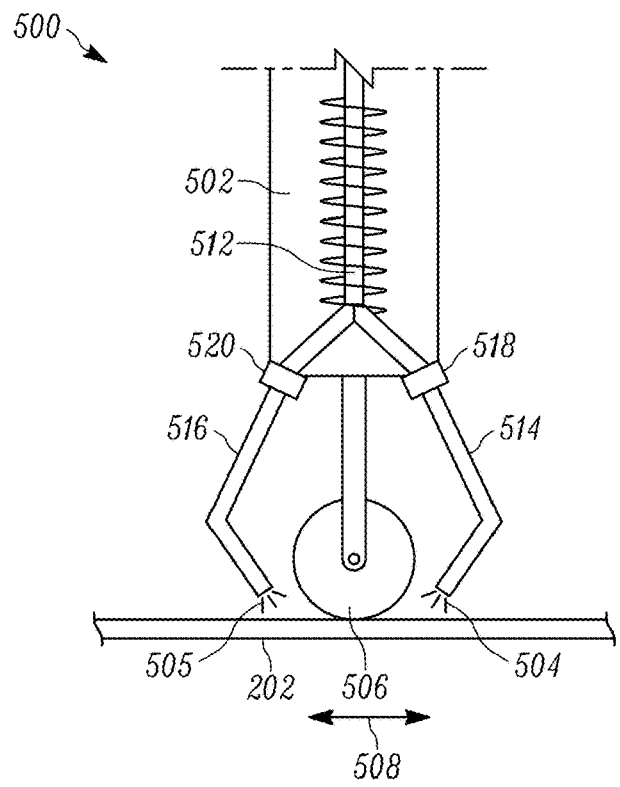
FIG. 5 is a partial side view of a further exemplary welding head.

While the welding head in at least some instances has rotational capabilities, so as to orient the source of heat relative to the source of pressure, in order that the source of heat precedes the source of pressure in the direction of travel, there may be instances where it may be desirable to be able to reduce the overall amount of rotation of the welding head. FIG. 5 illustrates a partial side view 500 of a further exemplary welding head 502, where the location of the applied heat 504 and 505 from the source of heat 510 can be redirected via one of two alternative paths, so as to allow for the heat source to precede the source of pressure 506 relative to multiple possible directions 508 of travel without rotating the welding head 502. More specifically, the conduit via which a heated air flow can be directed can include a trunk 512 and multiple branches 514 and 516. Each branch 514 or 516 can be coupled to the trunk 512 via a respective valve 518 and 520, which can be separately controlled to allow for the flow of air to be separately directed to different sides of the source of pressure 506. In this way, a source of heat 504 or 505 which precedes the source of pressure 506 can be selectively activated dependent upon the current direction of travel of the welding head 502. While the illustrated embodiment illustrates a design including two branches for accommodating two directions of travel, it is possible that still further branches and corresponding valves might be used to alternatively accommodate still further different directions of travel.

Figure 6:
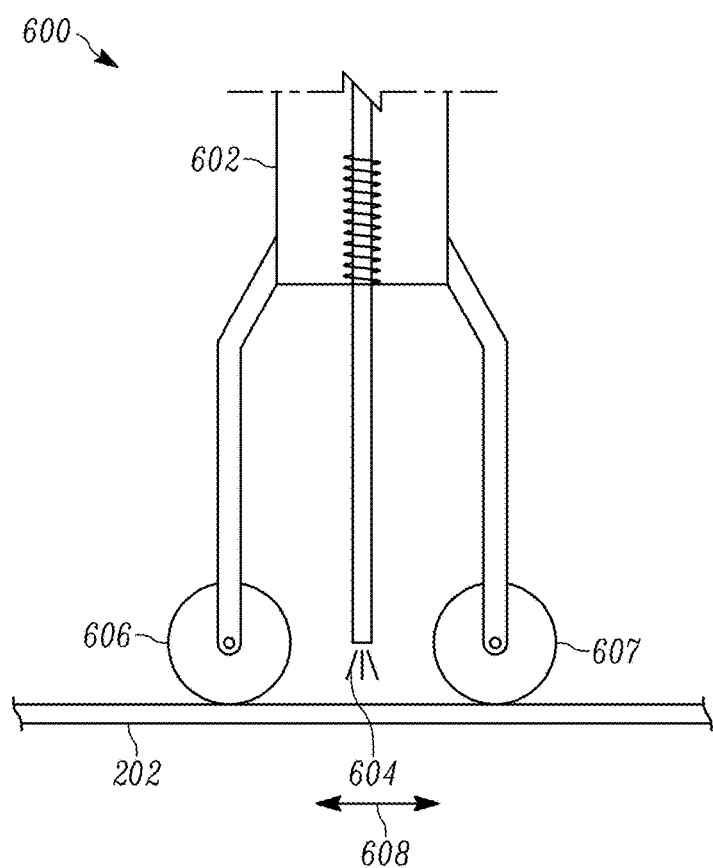
FIG. 6 is a partial side view of a still further exemplary welding head.

FIG. 6 illustrates a partial side view 600 of a still further exemplary welding head 602. In this illustrated embodiment, instead of multiplexing multiple possible locations for the application of a source of heat, the welding head incorporates multiple sources of pressure 606 and 607, which insures that a source of pressure follows the application of a source of heat 604 regardless of the particular one of at least two directions of travel. In this instance, a source of pressure will additionally precede the source of heat 604, however no welding will occur during the interaction of the preceding source of pressure, because the fabric material 212 and the frame 202 at this location of interaction has not yet been heated. Nevertheless, the subsequent source of pressure will still serve to facilitate the desired adhesion/welding.

Figure 7:
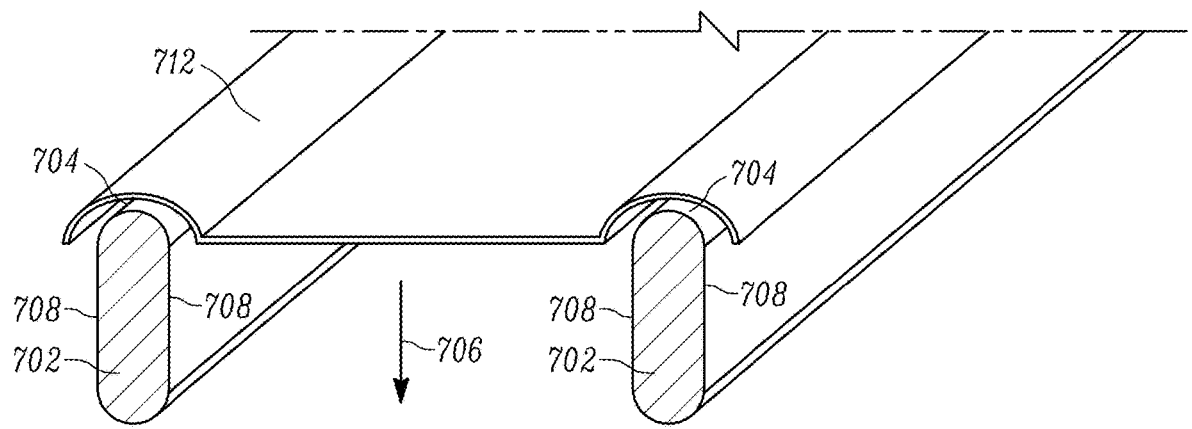
FIG. 7 is a partial exaggerated perspective cross-sectional view highlighting an exemplary welding of a fabric material to a frame.

FIG. 7 illustrates a partial exaggerated perspective cross-sectional view 700 highlighting an exemplary welding of a fabric material 712 to a frame 702. In the illustrated embodiment, in addition to adhering across a top surface 704 of the frame 702, the fabric material 712 also adheres at least partially in a downward direction 706 proximate one or more side surfaces 708 of the outer edge of the wire forming the frame 702. Such a pattern of adhesion can be supported by a pliable source of pressure, such as a rubber wheel, which allows the applied pressure to be spread across the top surface 704 and at least partially down the sides surfaces 708 of the wire forming the frame proximate the outer edge of the frame 702. This can help to take up at least some of any slack in the fabric material 712 as it rests on top and covers the frame 702, while the fabric material 712 waits to be adhered to the frame 702.

Figure 8:
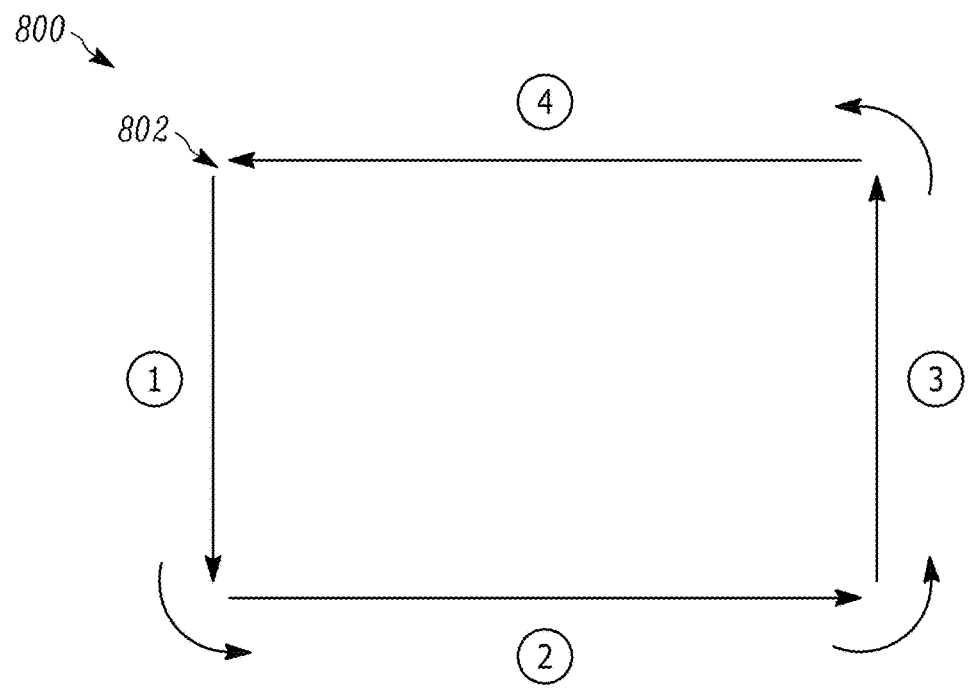
FIG. 8 is an exemplary path of a welding head that traces an outer edge of a rectangular shaped frame.

FIG. 8 illustrates an exemplary path 800 of a welding head that traces an outer edge of a rectangular shaped frame. In the present embodiment, the welding head starts at a first corner 802, and then traces each side in order until it completes the circuit at the point where the path started, namely the first corner 802. At each corner it is possible that the welding head will lift and rotate, before being lowered and continuing to weld the next adjacent side. In some instances, after rotation, it may also be desirable to back up the welding head slightly, so that proximate each corner a more complete adhesion is facilitated. In the illustrated embodiment, it may be desirable to start along the edge that is proximate the roll of fabric material, which in turn adheres the fabric material to the frame proximate to the source of fabric material at an earlier point of the tracing of the path.

Figure 9:
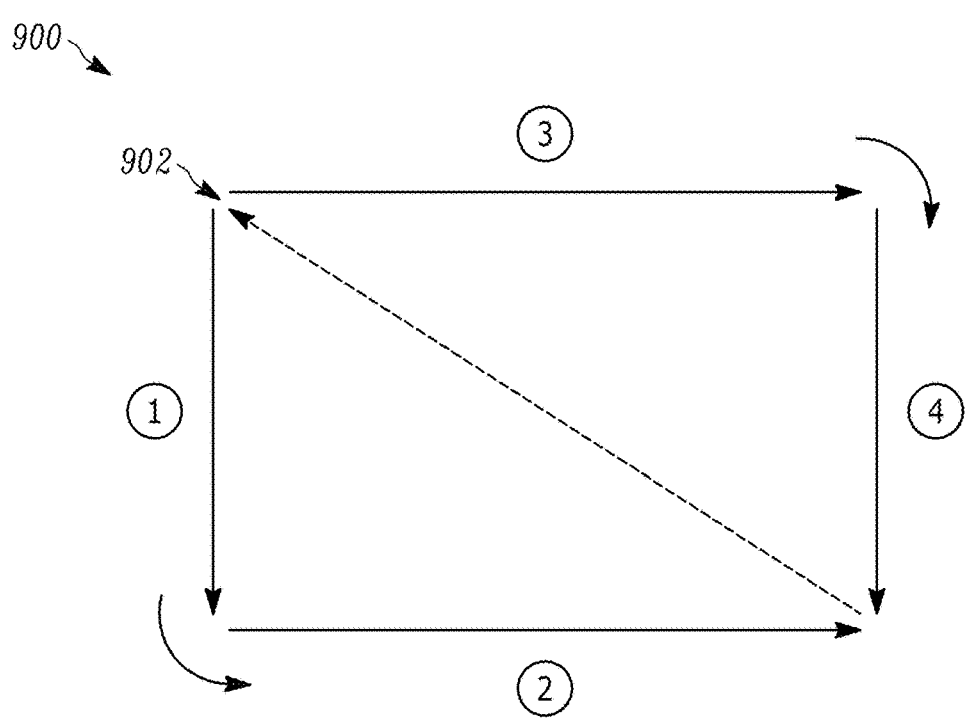
FIG. 9 is a further exemplary path of a welding head that traces an outer edge of a rectangular shaped frame.

FIG. 9 illustrates a further exemplary path 900 of a welding head that traces an outer edge of a rectangular shaped frame. In this embodiment, fewer rotations are necessary, at the expense of an extra leg of travel between the welding of the second and third sides. Further, the overall accumulated amount of rotation does not exceed a quarter turn, where the first turn is a counter-clockwise quarter turn, and the second turn is a clockwise quarter turn. In the path illustrated in FIG. 8, three sequential quarter counter-clockwise turns are provided, which when accumulated corresponds to a three quarters counter-clockwise turn.

While several exemplary paths 800 and 900 have been shown that generally correspond to a rectangular shaped frame, frames having non-rectangular paths are also possible. In such an instance a predetermined path of the welding head could be adjusted to correspond to whatever shape/outline the frame may have or is intended to have. In some instances, an optical recognition system could detect the path formed by the frame and make whatever movements are needed including tracking and rotation of the welding head, so as to follow the shape of the outline of the frame, as well as allow the source of heat to precede the source of pressure, as the outline is traversed.

While the welding head has been shown attached to a track along which the welding head can move, as well as a further set of tracks along which that the first track can travel, so as to facilitate movement of the welding head relative to the fabric material and the frame along the work surface, it is also possible that the welding head could be received at the end of a robotic arm. In such an instance, the base of the robotic arm could be selectively rotated, as well as include one or more joints that might be selectively controlled, so as to allow the end of the arm to trace the outline of frame, and support a corresponding welding of a fabric material to the frame. One skilled in the art will appreciate that still further forms of movement and control of the welding head relative to the work pieces are possible without departing from the teachings of the present application.

Figure 10:
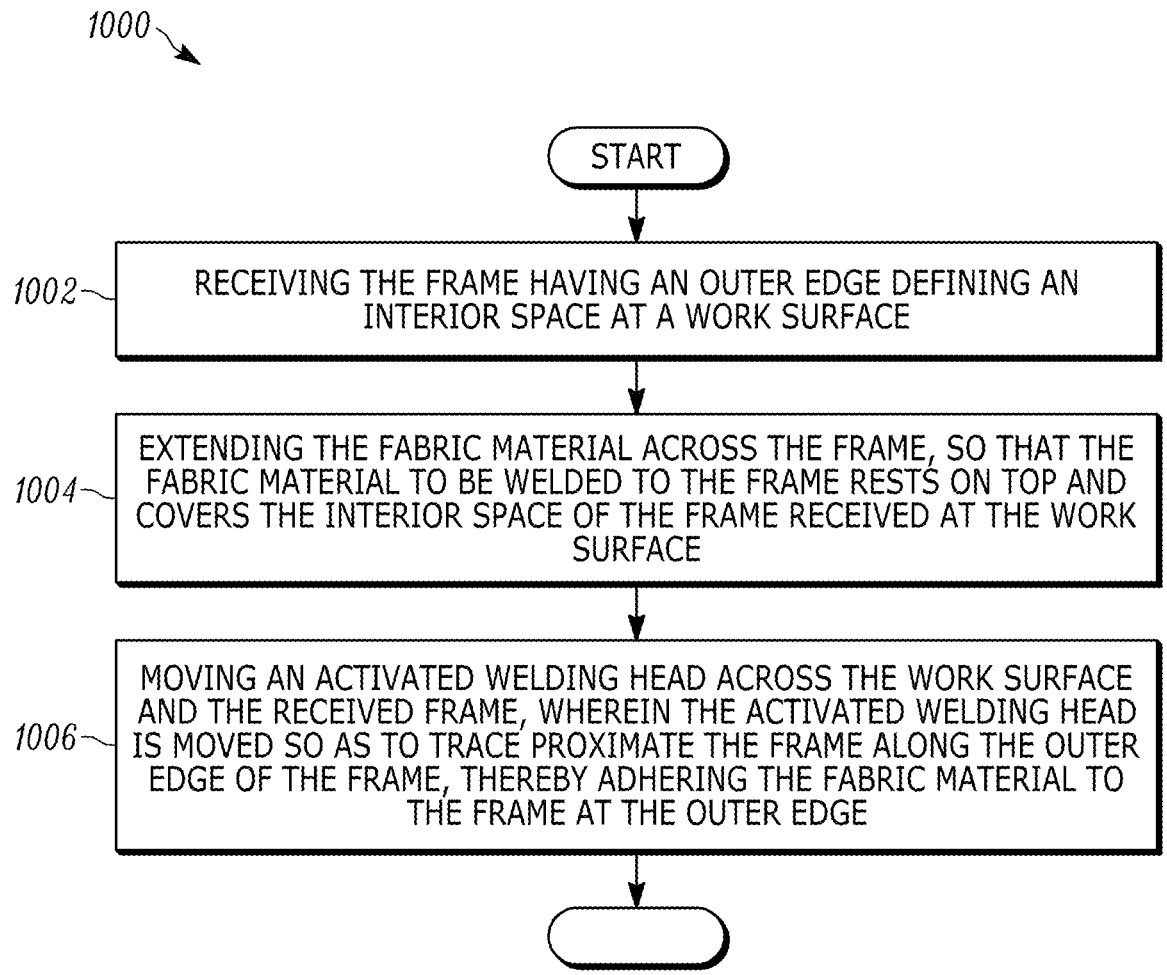
FIG. 10 is a flow diagram of a method for welding a fabric material to a frame for removable use in a door opening or a window opening.

FIG. 10 illustrates a flow diagram 1000 of a method for welding a fabric material to a frame. The method includes receiving 1002 the frame having an outer edge defining an interior space at a work surface. The fabric material is then extended 1004 across the frame, so that the fabric material to be welded to the frame rests on top and covers the interior space of the frame received at the work surface. An activated welding head is then moved 1006 across the work surface and the received frame, wherein the activated welding head is moved so as to trace proximate the frame along the outer edge of the frame, thereby adhering the fabric material to the frame at the outer edge.

In at least some instances, the frame can have a shape memory, and when the frame is received at the work surface, the frame is compressed against an internal bias to a desired shape. After the fabric material has been welded to the frame, and when the frame is released from the work surface, the shape of frame will be held by the welded fabric material under tension which is biased toward an uncompressed shape, which could be remembered by the frame.

While the preferred embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. An apparatus for welding a fabric material to a frame for removable use in a door opening or a window opening, the apparatus comprising:
   a work surface for receiving a frame having an outer edge defining an interior space, and for receiving fabric material, which after being received extends across the work surface and the frame including the interior space of the frame, wherein the work surface includes at least one rail, which is positioned to come into contact with at least a portion of the outer edge of the frame when the frame is received by the work surface for controlling at least a portion of a shape of the received frame against an internal bias in at least one side of the frame; and
   one or more welding heads, wherein at least one of the one or more welding heads, when activated, moves along the work surface along a path tracing the outer edge of the received frame for adhering the fabric material, which had been received by the work surface, to the frame at the outer edge;
   wherein at least one of the one or more rails includes a protruding structure that interacts with an optical detector associated with the one or more welding heads to identify a location of the path associated with the outer edge of the received frame.

2. An apparatus in accordance to claim 1, wherein the at least one of the one or more welding heads is coupled to the work surface via scaffolding including one or more motors which allows the at least one of the one or more welding heads to move across the work surface including proximate to and along the work surface along the path tracing the outer edge of the received frame.

3. An apparatus in accordance with claim 2, wherein the at least one of the one or more welding heads is coupled to the scaffolding via a rotatable coupling.

4. An apparatus in accordance with claim 2, wherein the at least one of the one or more welding heads is coupled to the scaffolding via a lifter.

5. An apparatus in accordance to claim 1, wherein the at least one of the one or more welding heads includes a heater element, which when activated, supplies heat to elements located proximate an end of the welding head.

6. An apparatus in accordance with claim 5, wherein the heater element includes a conduit having an opening proximate the end of the welding head for supplying a flow of heated air proximate the end of the welding head.

7. An apparatus in accordance with claim 5, wherein a respective one of the at least one of the one or more welding heads includes a first wheel in line with the heater element in a direction of movement of the respective one of the at least one of the one or more welding heads, wherein the first wheel supplies a force which presses a portion of the fabric material against a corresponding portion of the frame, as the respective one of the at least one of the one or more welding heads moves past them.

8. An apparatus in accordance with claim 7, wherein the respective one of the at least one of the one or more welding heads includes a second wheel in line with the heater element in the direction of movement of the respective welding head, wherein the first wheel and the second wheel are located on opposite sides of the heater element.

9. An apparatus in accordance with claim 1, wherein the path, along which the at least one of the one or more welding heads moves, changes direction.

10. An apparatus in accordance with claim 9, wherein the changes in direction of the path includes one or more turns, where each respective turn corresponds to a corner along a length of the outer edge of the frame.

11. An apparatus in accordance with claim 1, wherein the protruding structure is a wall that runs the length of the rail.

12. An apparatus in accordance with claim 1, wherein the protruding structure is a post.

13. An apparatus in accordance with claim 1, wherein a location of at least one of the one or more rails is adjustable for accommodating the receipt of frames having different sizes.

14. An apparatus in accordance with claim 1, wherein controlling at least a portion of a shape of the received frame against an internal bias by the at least one rail includes the at least the portion of the outer edge of the frame that comes into contact with the at least one rail when the frame is received by the work surface being restricted from bowing outward by the at least one rail.

15. An apparatus in accordance with claim 1, wherein controlling at least the portion of the shape of the received frame includes adjusting the shape of the frame to more closely conform to a rectangular shape.

16. An apparatus in accordance with claim 1, wherein the at least one rail includes one or more sets of rails between each of which the received frame is captivated.

17. An apparatus in accordance with claim 16, wherein each set of rails is adapted to hold the frame in place, as well as limit bowing in a respective portion of the at least one side of the received frame, wherein the internal bias in the at least one side of the received frame has a camber.

18. An apparatus for welding a fabric material to a frame for removable use in a door opening or a window opening, the apparatus comprising:
   a work surface for receiving a frame having an outer edge defining an interior space, and for receiving fabric material, which after being received extends across the work surface and the frame including the interior space of the frame, wherein the work surface includes at least one rail, which is positioned to come into contact with at least a portion of the outer edge of the frame when the frame is received by the work surface for controlling at least a portion of a shape of the received frame against an internal bias in at least one side of the frame; and
   one or more welding heads, wherein at least one of the one or more welding heads, when activated, moves along the work surface along a path tracing the outer edge of the received frame for adhering the fabric material, which had been received by the work surface, to the frame at the outer edge;
   wherein the at least one of the one or more welding heads includes a heater element, which when activated, supplies heat to elements located proximate an end of the welding head;
   wherein a respective one of the at least one of the one or more welding heads includes a first wheel in line with the heater element in a direction of movement of the respective one of the at least one of the one or more welding heads, wherein the first wheel supplies a force which presses a portion of the fabric material against a corresponding portion of the frame, as the respective one of the at least one of the one or more welding heads moves past them; and
   wherein the heater element includes a conduit having two branches separately coupled to a main trunk via a respective valve, where each of the branches have an opening in line with and on opposite respective sides of the first wheel, wherein the respective valve associated with the branch having the opening which is in front of the first wheel relative to a current direction of movement of the respective one of the at least one of the one or more welding heads is open so as to allow the welding head to supply a flow of heated air when activated in advance of the first wheel pressing the heated portion of the fabric material against the corresponding portion of the heated frame.

* * * * *